United States Patent
Need

(10) Patent No.: US 11,570,963 B2
(45) Date of Patent: Feb. 7, 2023

(54) METHOD, CONTROL, MESSAGE RECEIPT MODULE, DATA MESSAGE FORMAT AND NETWORK PROTOCOL FOR FARM SYSTEM

(71) Applicant: Fusion Electronics B.V., Houten (NL)

(72) Inventor: Ronald Need, Houten (NL)

(73) Assignee: Fusion Electronics B.V., Houten (NL)

( * ) Notice: Subject to any disclaimer, the term of this patent is extended or adjusted under 35 U.S.C. 154(b) by 0 days.

(21) Appl. No.: 16/180,687

(22) Filed: Nov. 5, 2018

(65) Prior Publication Data
US 2019/0141941 A1 May 16, 2019

Related U.S. Application Data

(63) Continuation of application No. 14/396,930, filed as application No. PCT/NL2013/050311 on Apr. 24, 2013, now abandoned.

(30) Foreign Application Priority Data

Apr. 24, 2012 (NL) ...................................... 1039562

(51) Int. Cl.
*A01J 5/007* (2006.01)
*A01K 1/12* (2006.01)
(Continued)

(52) U.S. Cl.
CPC ................. *A01J 5/007* (2013.01); *A01K 1/12* (2013.01); *G05B 15/02* (2013.01); *H04L 61/35* (2013.01);
(Continued)

(58) Field of Classification Search
CPC ...... A01J 5/007; H04L 67/12; H04L 61/2038; H04L 61/6004; H04L 61/35; G05B 15/02; A01K 1/12
See application file for complete search history.

(56) References Cited

U.S. PATENT DOCUMENTS

| | | | |
|---|---|---|---|
| 6,543,381 B1 | 4/2003 | Birk et al. | |
| 6,814,026 B2 | 11/2004 | Guo | |

(Continued)

FOREIGN PATENT DOCUMENTS

| | | | |
|---|---|---|---|
| WO | 02097555 A2 | 12/2002 | |
| WO | 2005003882 A2 | 1/2005 | |
| WO | 2007071406 A2 | 6/2007 | |

OTHER PUBLICATIONS

Raab, "CAN—Controller Area Network", 2420 Elektor Electronics, Sep. 18, 1992. pp. 56-59, No. 203, London GB.
(Continued)

*Primary Examiner* — Nathan L Laughlin
(74) *Attorney, Agent, or Firm* — The Webb Law Firm

(57) ABSTRACT

The present invention relates to a method for controlling devices within an agricultural network system via a network bus such as a physical network bus or a logical network bus, wherein the devices are controlled by means of control information which is transmitted to the devices by means of messages comprising a content and a header title, the method comprising steps for:—determining a function for performing thereof by a device in the network,—determining the content of a message to be transmitted,—compiling header title information for inclusion thereof in a header title for the message to be transmitted, wherein—the header title information comprises a predetermined number of data fields, such as preferably a network identifier, a device type designation, a function designation, a location designation and/or a group designation, for the purpose of determining on the basis of compliance with one or more of these data fields which device or devices receive(s) the message.

13 Claims, 8 Drawing Sheets

Control Valve (CV)

| | Function ID |
|---|---|
| puls cow | 0 0 0 1 |
| puls goat | 0 0 1 0 |
| vacuum | 0 0 1 1 |
| ACR | 0 1 0 0 |
| gen. out | 0 1 0 1 |

| | Funct Config. | |
|---|---|---|
| cow pulsator | 0 0 0 1 0 | 0 1 1 |
| goat pulsator R | 0 0 1 0 0 | 0 0 1 |
| goat pulsator L | 0 0 1 0 0 | 0 1 0 |
| vacum R | 0 0 1 1 0 | 0 0 1 |
| vacum R | 0 0 1 1 0 | 0 1 0 |
| ACR R | 0 1 0 0 0 | 0 0 1 |
| ACR L | 0 1 0 0 0 | 0 1 0 |
| Gen out R | 0 1 0 1 0 | 0 0 1 |
| Gen out L | 0 1 0 1 0 | 0 1 0 |

1= swing over
0= normal

(51) Int. Cl.
  *H04L 61/00* (2022.01)
  *H04L 61/5038* (2022.01)
  *G05B 15/02* (2006.01)
  *H04L 67/12* (2022.01)
  *H04L 101/604* (2022.01)

(52) U.S. Cl.
  CPC .......... *H04L 61/5038* (2022.05); *H04L 67/12* (2013.01); *H04L 2101/604* (2022.05)

(56) References Cited

U.S. PATENT DOCUMENTS

| | | |
|---|---|---|
| 7,889,051 B1 | 2/2011 | Billig et al. |
| 8,170,722 B1 | 5/2012 | Elberbaum |
| 8,942,170 B1 * | 1/2015 | Fang ................ H04W 4/08 370/328 |
| 2004/0015262 A1 | 1/2004 | Brown et al. |
| 2004/0083293 A1 | 4/2004 | Chen et al. |
| 2009/0133634 A1 | 5/2009 | Axelsson et al. |
| 2009/0248896 A1 | 10/2009 | Cohn |
| 2010/0249955 A1 * | 9/2010 | Sitton .................. G05B 15/02 700/33 |
| 2012/0041572 A1 * | 2/2012 | Halsall .............. H04L 12/40032 700/19 |
| 2013/0282931 A1 | 10/2013 | Petzen et al. |

OTHER PUBLICATIONS

Zeltwanger; "CAN-Chips-die große Vielfalt; Vor= und Nachteile der angebotenen CAN-Controller"; 2087 Elektronik; Apr. 19, 1994; pp. 68 and 70-73; vol. 43; No. 8; Munchen, DE.

* cited by examiner

Control Valve (CV)

| | Function ID |
|---|---|
| puls cow | 0 0 0 1 |
| puls goat | 0 0 1 0 |
| vacuum | 0 0 1 1 |
| ACR | 0 1 0 0 |
| gen. out | 0 1 0 1 |

| | Funct Config. | | |
|---|---|---|---|
| cow pulsator | 0 0 0 1 | 0 | 0 1 1 |
| goat pulsator R | 0 0 1 0 | 0 | 0 0 1 |
| goat pulsator L | 0 0 1 0 | 0 | 0 1 0 |
| vacum R | 0 0 1 1 | 0 | 0 0 1 |
| vacum R | 0 0 1 1 | 0 | 0 1 0 |
| ACR R | 0 1 0 0 | 0 | 0 0 1 |
| ACR L | 0 1 0 0 | 0 | 0 1 0 |
| Gen out R | 0 1 0 1 | 0 | 0 0 1 |
| Gen out L | 0 1 0 1 | 0 | 0 1 0 |

1= swing over
0= normal

Fig. 8

METHOD, CONTROL, MESSAGE RECEIPT MODULE, DATA MESSAGE FORMAT AND NETWORK PROTOCOL FOR FARM SYSTEM

CROSS-REFERENCE TO RELATED APPLICATIONS

This application is a continuation of U.S. patent application Ser. No. 14/396,930 which is the United States national phase of International Application No. PCT/NL2013/050311 filed Apr. 24, 2013, which claims priority to The Netherlands Patent Application No. 1039562 filed Apr. 24, 2012, the disclosures of which are hereby incorporated in their entirety by reference.

BACKGROUND OF THE INVENTION

Field of the Invention

The present invention relates to a method for controlling devices within an agricultural network system via a network bus, such as a physical network bus or a logical network bus, wherein the devices are controlled by means of control information which is transmitted to the devices by means of messages comprising a content and a header title. The present invention also relates to a control device and/or a control server. The present invention also relates to a message reception module, preferably for arrangement in a functional device. The present invention also relates to a data message format. The present invention also relates to a network protocol.

Description of Related Art

It is known to link a number of devices on a farm to a central server by means of a network. In a rudimentary sense it is hereby possible for instance to exchange data between a milking machine and a server. Such a system has the advantage that such data become available electronically at the server. For efficient operational management it is however increasingly important that processes, such as for instance milking, can be monitored such that control can hereby be optimized.

SUMMARY OF THE INVENTION

The present invention provides for this purpose a method for controlling devices within an agricultural network system via a network bus such as a physical network bus or a logical network bus, wherein the devices are controlled by means of control information which is transmitted to the devices by means of messages comprising a content and a header title, the method comprising steps for:
  determining a function for performing thereof by a device in the network,
  determining the content of a message to be transmitted,
  compiling header title information for inclusion thereof in a header title for the message to be transmitted, wherein the header title information comprises a predetermined number of data fields, such as each defining a subset of devices, preferably defining a network identifier, a device type designation, a function designation, a location designation and/or a group designation, for the purpose of determining on the basis of compliance with one or more of these data fields which device or devices receive(s) the message.

If for instance a dairy cow is transferred from one group to another group, the present invention provides the advantage that the milking process can be optimized for this specific animal.

A further advantage of a method according to the present invention is that groups of devices can be controlled directly by means of standard messages, wherein the header title provides for the specific addressing. It hereby becomes possible for instance for individual milk pulsators of different installations to be controlled separately, but also for all to be controlled with one addressing on the basis of the device type. All milk pulsators of each station can for instance thus be controlled with one message.

Conversely, the status of all devices can also be retrieved, on the basis of which a central control can receive data from all stations or devices.

For instance in the case a mass meter for the milk extracted from a cow is applied, the status thereof can be continuously tracked, on the basis of which other systems in the milking system can be controlled in optimal manner.

In addition to the stated example of a milking system, the present invention can also be applied to all manner of types of device applied within an agricultural system, such as for manure processing, feeder systems, systems for controlling the temperature in living areas, systems for cooling products such as cooling tanks, access systems such as gates, identification systems and so on.

A subset according to the present invention represents a cross-section of the total number of devices, wherein each device is a network node. The network is hereby divided physically, by means of a message reception module such as a network card, or logically into a number of sets. Examples hereof are sets such as functions, locations, groups, device type or parts of the network. In a first preferred embodiment a first type of data field, a type field, relates to a type of device connected to the network bus, which type can have an overlap with networks, functions, locations or groups. An instruction message can be transmitted by means of such a field to one or all of these devices.

In a further preferred embodiment a second type of data field, a function field, relates to a function to be performed by a device, which function can have an overlap with types, networks, locations or groups, this function preferably relating to a milk pulsator, an automatic teat cup remover, a shut-off valve or a gate control. An instruction message can be transmitted by means of such a field to one or all of these devices.

In a further preferred embodiment a third type of data field, a location field, relates to a location of a device, which location can have an overlap with types, networks, functions or groups. An instruction message can be transmitted by means of such field to one or all of these devices.

In a further preferred embodiment a fourth type of data field, a group field, relates to a group of devices, which groups can have an overlap with types, networks, functions or locations. An instruction message can be transmitted by means of such a field to one or all of these devices.

In a further preferred embodiment a fifth type of data field, a network, relates to a network of devices, which network can have an overlap with types, functions, locations or groups. An instruction message can be transmitted by means of such a field to one or all of these devices.

In combination the stated preferred embodiments specify possible combinations for compiling a header title comprising identification information for identifying a precisely defined subset of the devices connected to the network bus. Status information of such devices can hereby be retrieved, whereby accurate information can be collected about any realizable combination of devices.

The control of the devices can be optimized to considerable extent on the basis of predetermined programs, but can also be influenced by such status information. It is hereby possible to achieve that the yields of the agricultural processes are optimized, and that the costs of performing the agricultural processes are minimized, and that these are adapted to each other for the purpose of optimizing the overall process.

In a further preferred embodiment a data field is more preferably suitable for identifying 256 devices, such as by means of two hexadecimal characters. If a greater number of devices have to be identified, a greater number of information bits can be applied within the context of the present invention. The header title can here more preferably comprise a message type identifier.

In a further preferred embodiment a value of any said data field is a broadcast value for designating each device which complies with this data field. The value 00 is applied for this purpose in the examples.

A further aspect according to the present invention relates to a control device and/or control server suitable for controlling, by means of a method according to one or more of the foregoing claims, devices within an agricultural network system via a network bus, such as a physical network bus or a logical network bus, wherein the devices are controlled by means of control information transmitted to the devices by means of messages comprising a content and a header title. Advantages as indicated with reference to the method are achieved by means of such a control device. Such a control device can be a server or a workstation or any other computer provided with software for executing the method.

A further aspect according to the present invention relates to a message reception module suitable for receiving messages compiled in accordance with a method according to one or more of the foregoing claims, which message reception module can be arranged in a device which can be applied within an agricultural network system. Such a module can comprise a per se known network card provided with software or hardware components which make it suitable for executing the method or for receiving the messages.

A further aspect according to the present invention relates to a device which can be applied within an agricultural network system for control by means of a method according to the present invention and which is suitable for comprising a message reception module according to the present invention.

A further aspect according to the present invention relates to a network bus, such as a physical network bus or a logical network bus, which can be or is applied for executing a method according to the present invention.

A further aspect according to the present invention relates to a data message format generated by means of a method according to the present invention for controlling devices within an agricultural network system via a network bus such as a physical network bus or a logical network bus, wherein the devices are controlled by means of control information transmitted to the devices by means of messages comprising a content and a header title.

A further aspect according to the present invention relates to a network protocol for applying in a method according to the present invention for controlling devices within an agricultural network system via a network bus such as a physical network bus or a logical network bus, wherein the devices are controlled by means of control information transmitted to the devices by means of messages comprising a content and a header title.

The invention has various preferred embodiments which will become apparent from the description below of several such embodiments. The advantageous inventive features of the invention in all its aspects, including the measures defined in the dependent claims, are by no means limited to the considerations stated above and/or below.

BRIEF DESCRIPTION OF THE DRAWINGS

Further advantages, features and details of the present invention are elucidated on the basis of a number of embodiments with reference to the accompanying figures, in which:

FIG. 8-10 show schematic representations of messages according to further preferred embodiments of the present invention.

DESCRIPTION OF THE INVENTION

Figure 1:
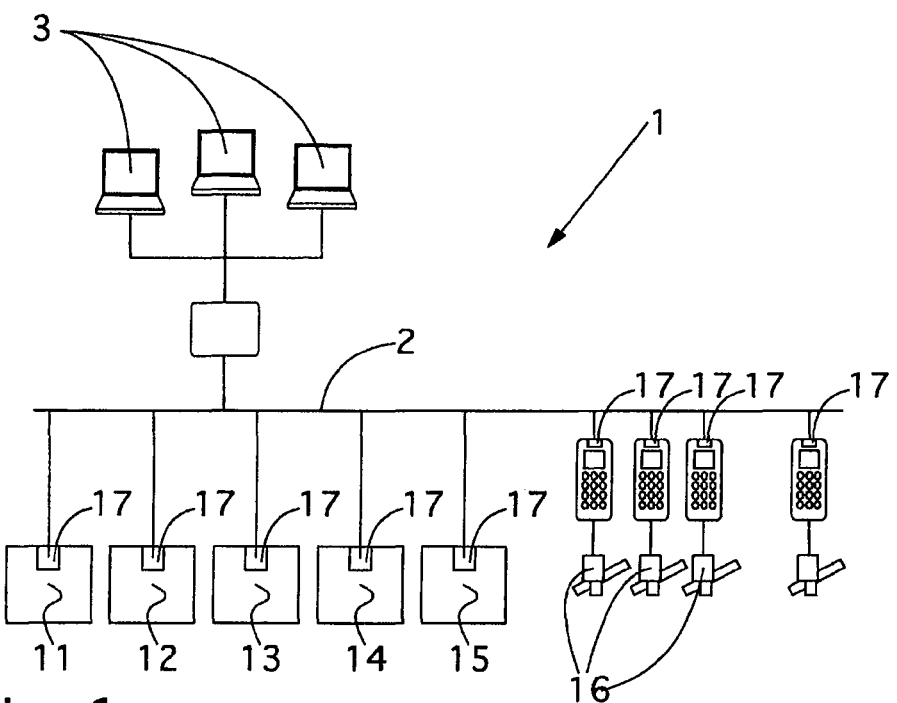
FIG. 1 shows a schematic overview of a preferred embodiment according to the present invention.

A first preferred embodiment according to the present invention relates to a farm management system 1. The backbone of the system is the network bus 2 for linking the systems. Coupled to the bus 2 are workstations or servers 3 with which the devices in the lower part of the figure can be controlled. Each device for controlling comprises a network card 17 which is configured to receive or reject messages in correct manner in accordance with a method and protocol according to the present invention.

Cooled storage tanks 11, 12 are coupled to computers 3 by means of network bus 2. A control 13 for a gate, a weighing system 14 for weighing products or animals, an identification system 15 and milk meters 16 for measuring the mass of milk are further coupled to the bus. Each of these devices has to be controlled and be able to send information back to the computers.

Figure 2:
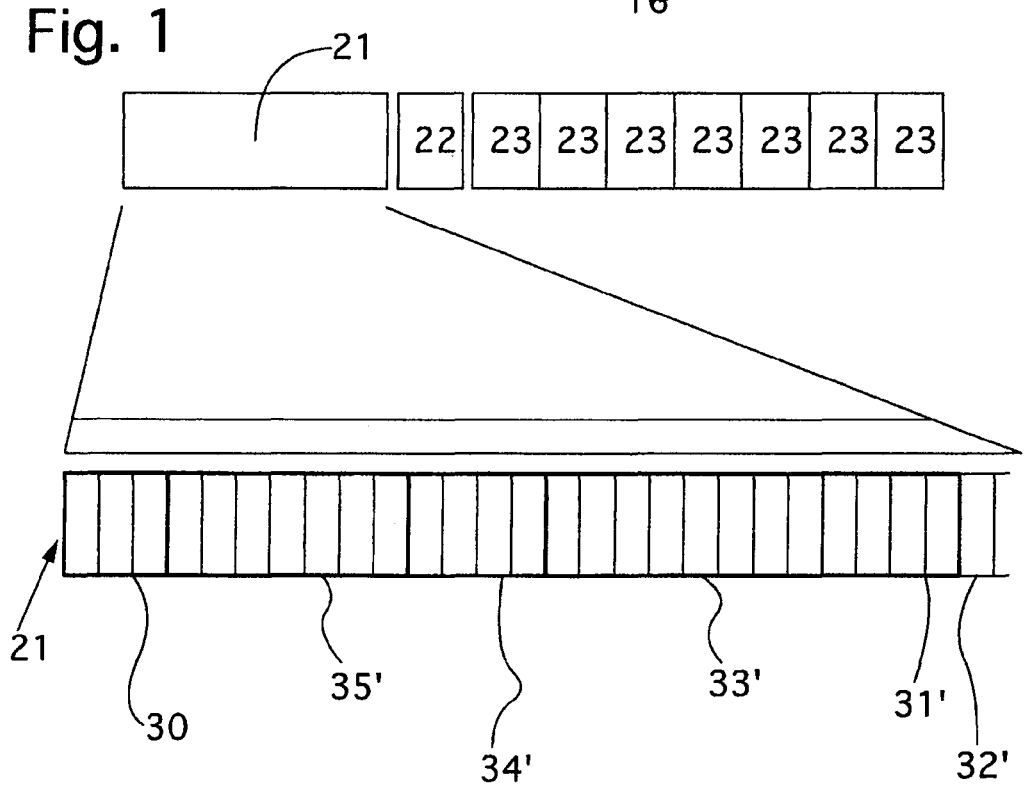
FIG. 2 shows a schematic representation of a preferred embodiment of a message comprising a header title according to the present invention.

Shown schematically in FIG. 2 is a message according to the present invention. The message comprises a header title 21 and a DLC field 22, in addition to data fields 23 for content of the message.

Header title 21 comprises a message indicator 30, a field 35' for designating the type 35 of device for which the message is intended, a function field 34' for designating the function 34 of the device for which the message is intended, a location field 33' for designating the location 33 of the device for which the message is intended, a group field 31' for designating the group 31 of the device for which the message is intended and a network field 32' for designating the network 32 for which the message is intended.

The above stated designations of the fields are indicative of the inventive concept that the 29 bits identifier can be divided in groupwise manner into areas for identifying locations or functions, in this case for instance the 3 bits message identifier, 7 bits device type 35', which in addition to designating the type of device can also designate a type of function, a 4 bits index number 34' for designating a function or subfunction, the 8 bits location identifier 33', the 4 bits group identifier 31' and/or the 3 bits network identifier 32'.

Figure 3:
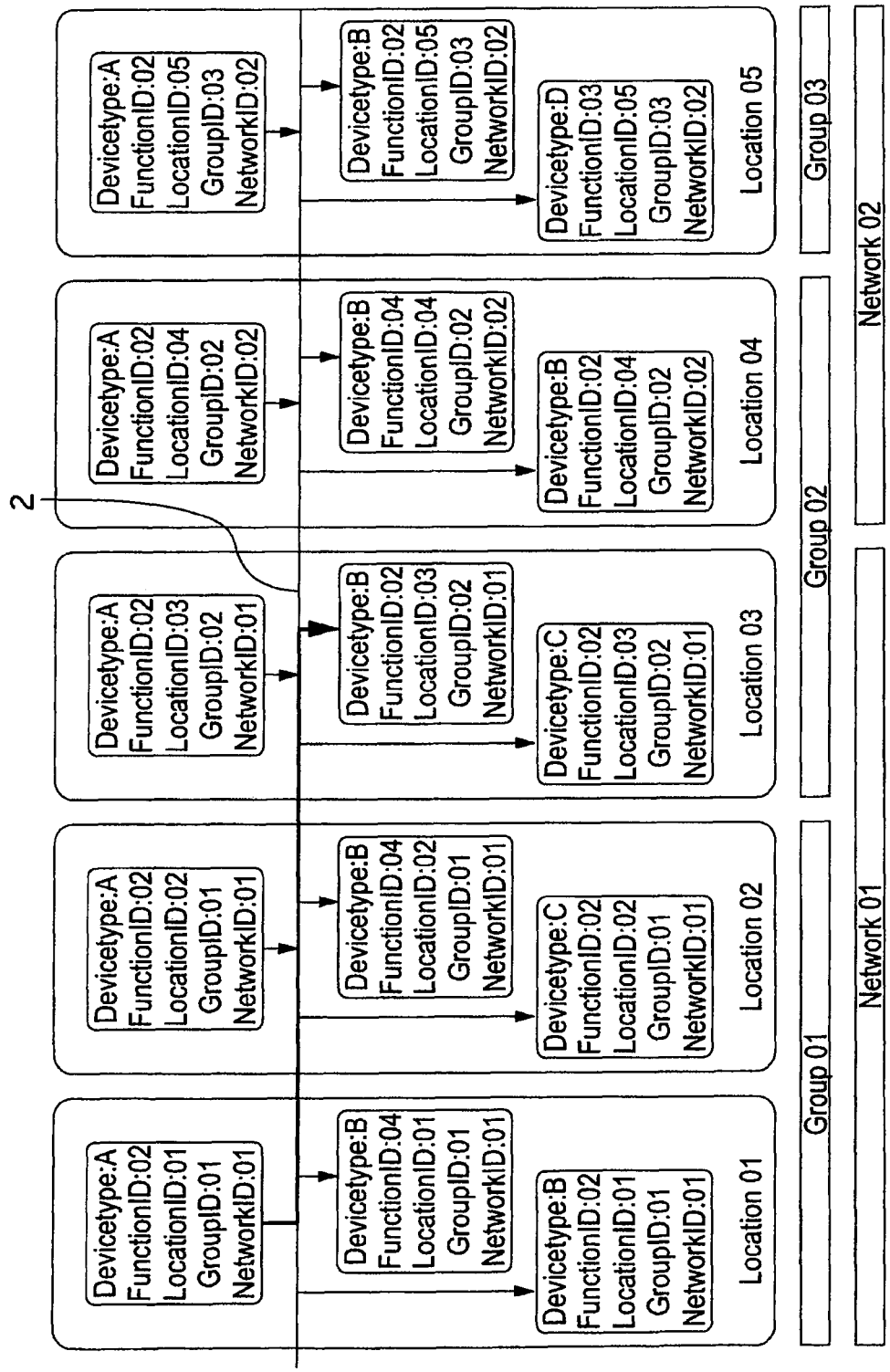
FIG. 3-7 show schematic representations of a preferred embodiment of addressing according to the present invention.

Shown in schematic manner in FIG. 3 is an addressing of a message intended for a specific device. The addressing is as follows.

From: [DeviceType: (A)+FunctionID: (02), LocationID: (01), GroupID: (01), NetworkID: (01)]
To: [DeviceType: (B)+FunctionID: (02), LocationID: (03), GroupID: (02), NetworkID: (01)].

Figure 4:
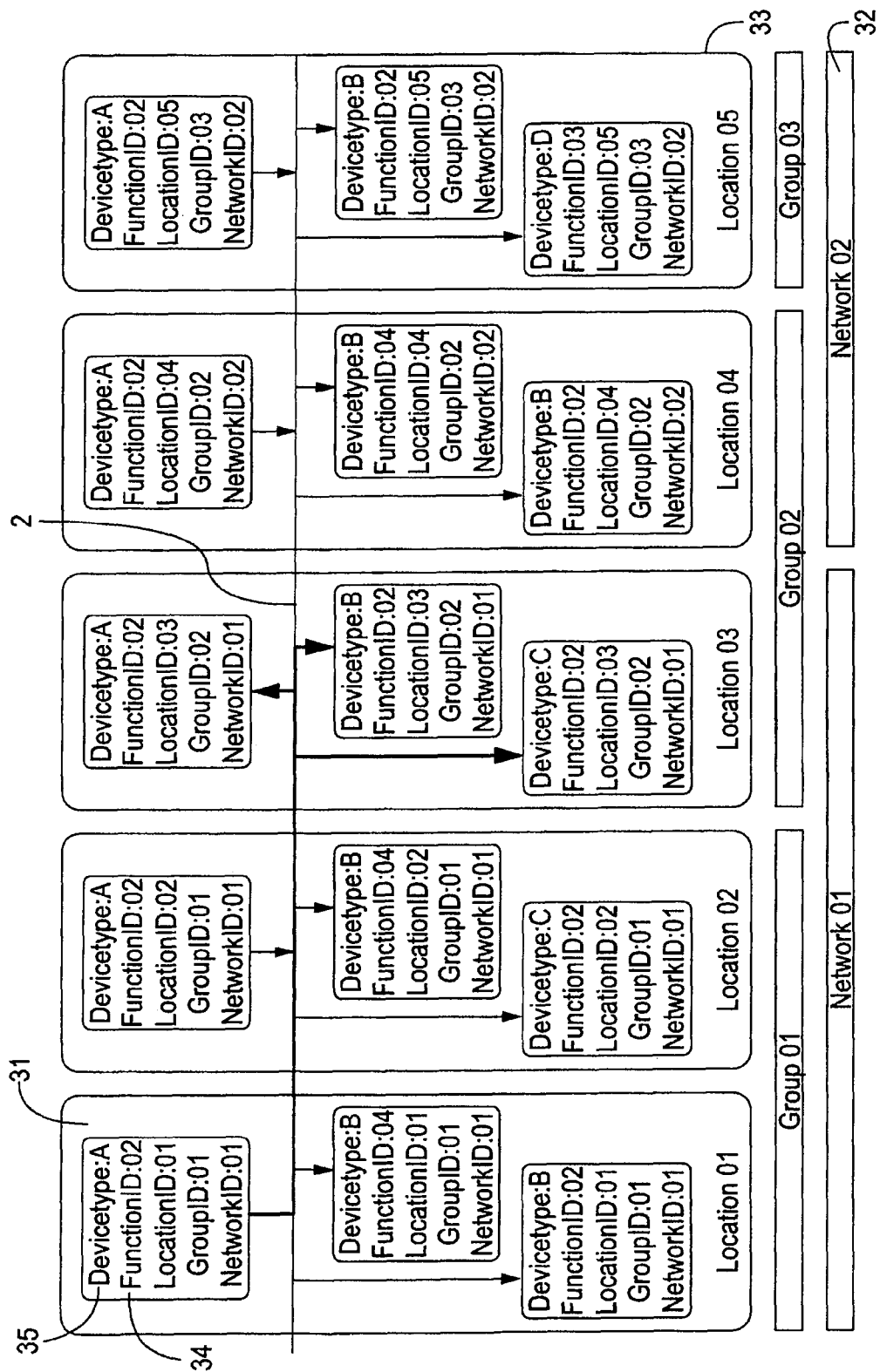

Shown in schematic manner in FIG. 4 is an addressing of a message addressed to all devices at a location. As stated above, a broadcast is indicated by means of the designation 0 0. The addressing is as follows.

From: [DeviceType: (A)+FunctionID: (02), LocationID: (01), GroupID: (01), NetworkID: (01)]
To: [DeviceType: (00)+FunctionID: (00), LocationID: (03), GroupID: (00), NetworkID: (00)].

Figure 5:
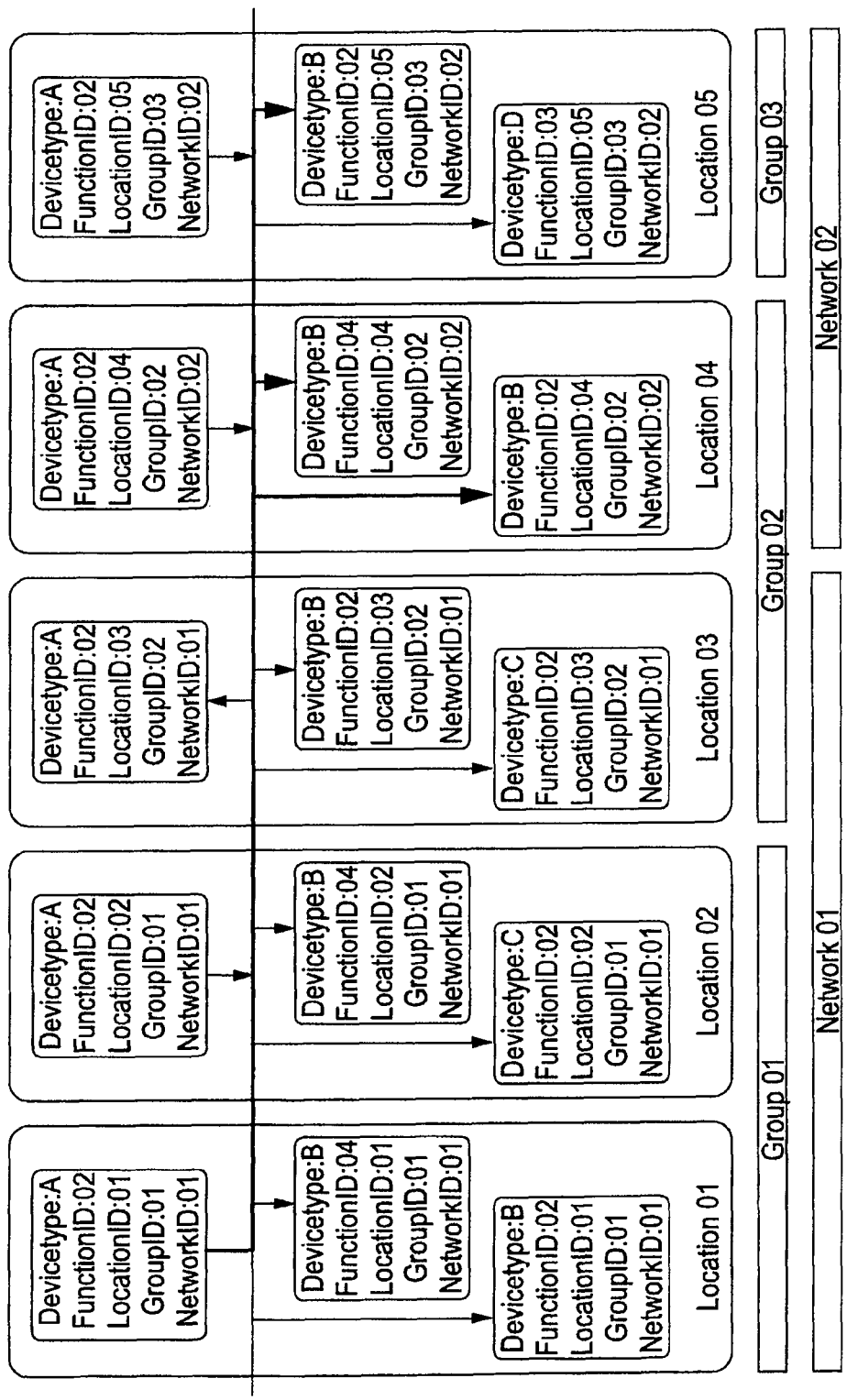

Shown in schematic manner in FIG. 5 is an addressing of a message addressed to all devices of the type B with a network identifier 02. The addressing is as follows.

From: [DeviceType: (A)+FunctionID: (02), LocationID: (01), GroupID: (01), NetworkID: (01)]
To: [DeviceType: (B)+FunctionID: (00), LocationID: (00), GroupID: (00), NetworkID: (02)].

Figure 6:
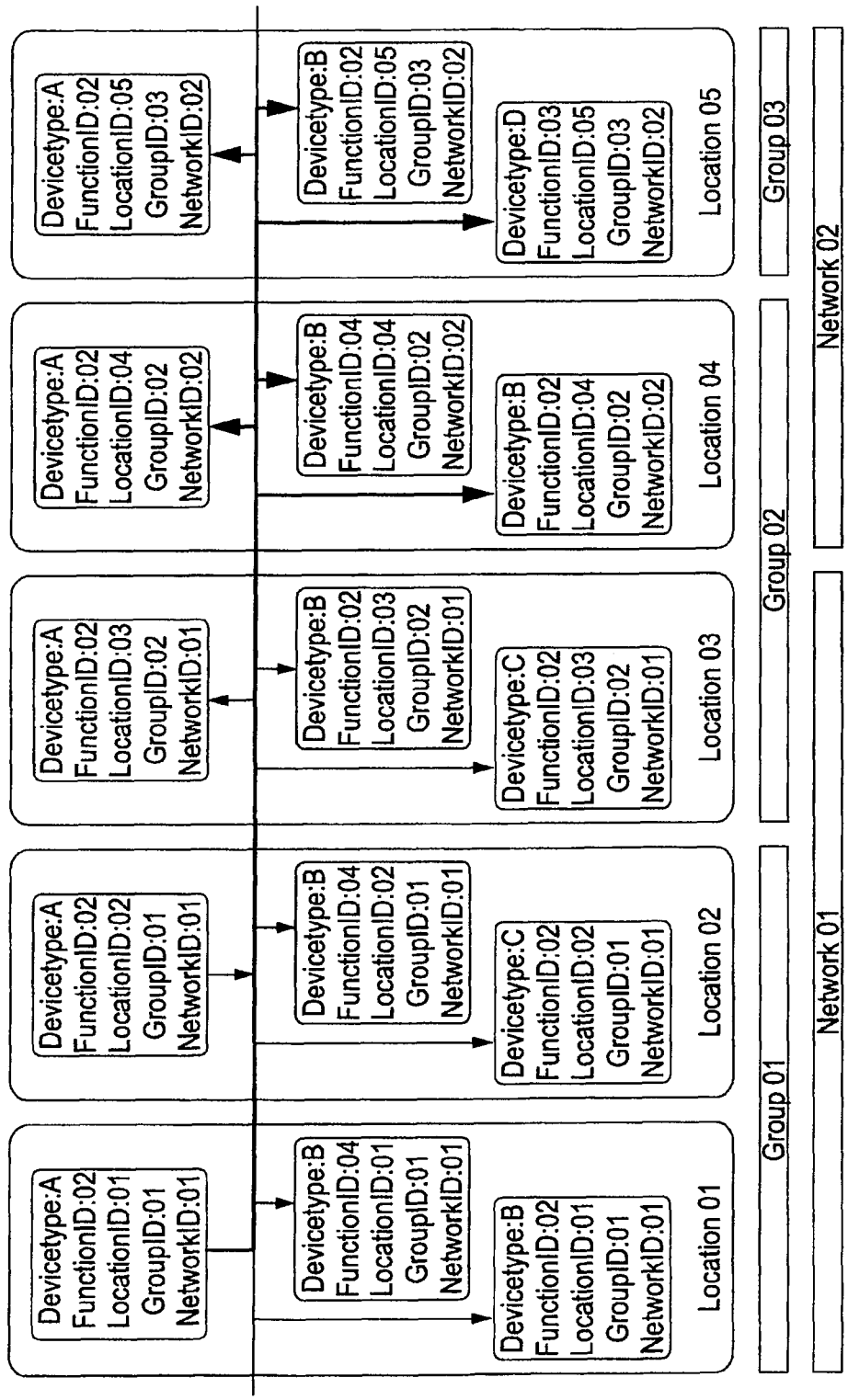

Shown in schematic manner in FIG. 6 is an addressing of a message addressed to all devices of the type network 2. The addressing is as follows.

From: [DeviceType: (A)+FunctionID: (02), LocationID: (01), GroupID: (01), NetworkID: (01)]
To: [DeviceType: (00)+FunctionID: (00), LocationID: (00), GroupID: (00), NetworkID: (02)].

Figure 7:
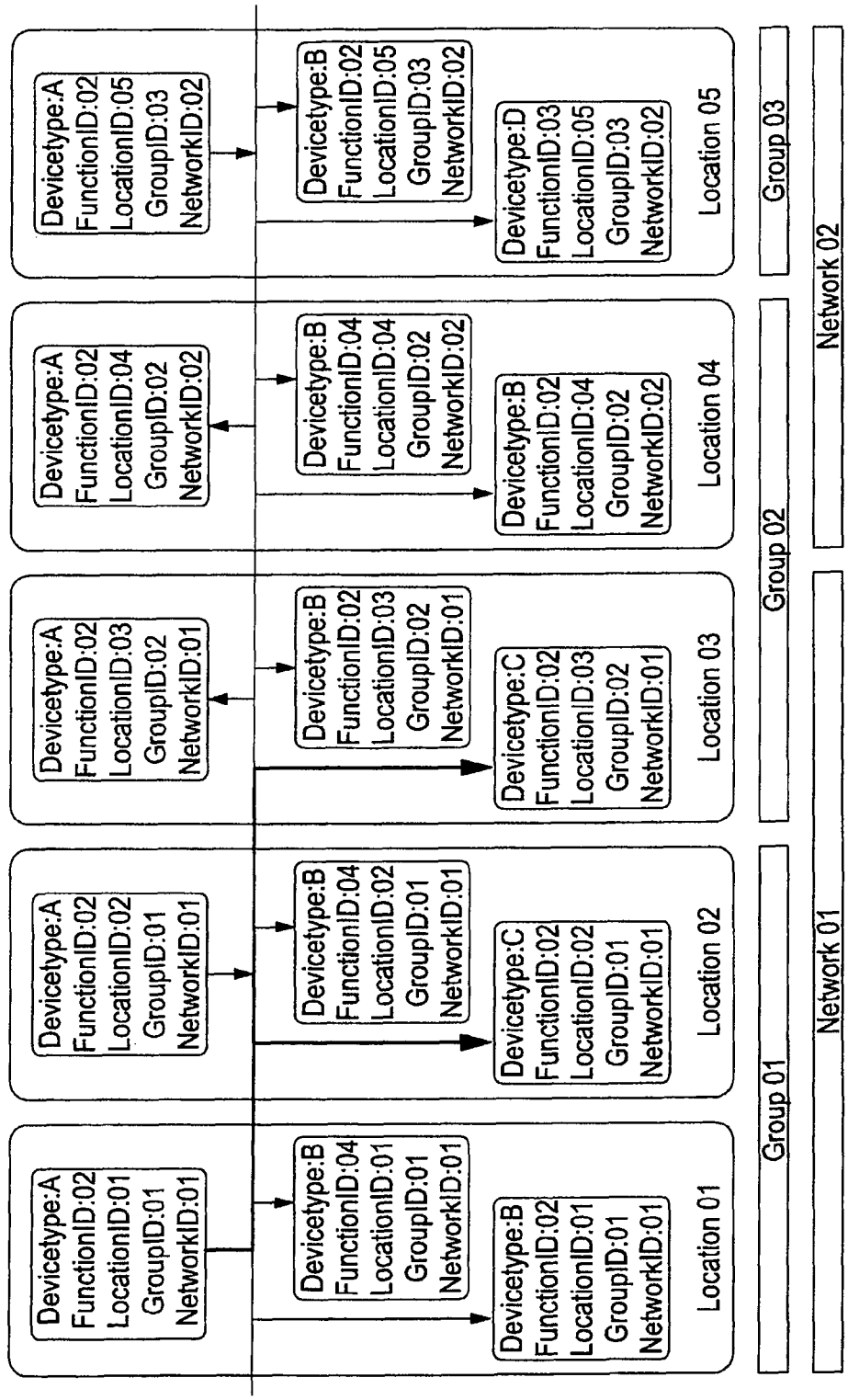
Figure 9:
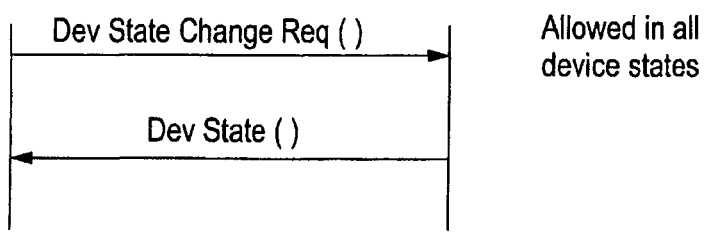
Figure 10:
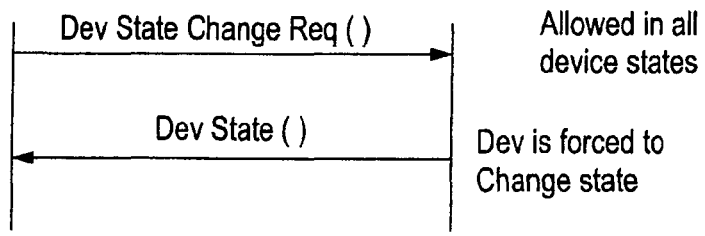

Shown in schematic manner in FIG. 7 is an addressing of a message addressed to all devices with a function designation 0 2. The addressing is as follows.

From: [DeviceType: (A)+FunctionID: (02), LocationID: (01), GroupID: (01), NetworkID: (01)]
To: [DeviceType: (C)+FunctionID: (02), LocationID: (00), GroupID: (00), NetworkID: (00)].

The invention can be used for, among others, the following application. A control valve (CV) has two coils which can be actuated independently of each other in order to open or close a vacuum channel. The electronics built into the CV provide for the actuation of these coils. A CV can be used for many applications, several possibilities following below:

CV as pulsator: necessary for milk extraction from the udder. For this function the coils are actuated alternately, for instance at a pulsation rhythm of 60 times per minute and a pulsation ratio (open/closed) of 60/40. Stimulation can be applied at the start of milking, and the pulsation rhythm is increased here (to e.g. 300) and the pulsation ratio can also be modified as required. Flow controlled pulsation (FCP) is also a possibility. Here the pulsation rhythm and/or the pulsation ratio are modified during milking depending on the measured milk flow.

CV as automatic cup remover (ACR): returns the milking cluster to rest position at the end of milking by actuating the ACR vacuum cylinder.

CV as shut-off valve: closes the milk conduit after milking by actuating the shut-off valve.

CV as gate control: operates the entrance or exit gates to the milking stall by means of vacuum cylinders.

Combinations of the above stated functions are also possible, for instance one coil configured as ACR and one coil configured as shut-off valve. The behaviour of the CV differs for each function. A CV as pulsator has a specific task and must listen to and act on specific FarmCAN™ messages intended for the CV as pulsator. When a CV is set as gate control, it will have to respond to FarmCAN™ messages specific to gate operation and so on. This can be done without modifying anything in the hardware or electronics of the CV. According to the present invention the CV according to the present invention is equipped with means for receiving and interpreting messages encoded according to the present invention. These means are programmable so as to be suitable for executing such functions. For the purpose of the application as pulsator, different pulse sequences are for instance programmable, after which the desired pulse sequence is selectable by means of the messages according to the present invention for the purpose of performing the milking, for instance by means of a predetermined entry in the field 35' or the field 34'. Use can therefore be made here of sequences specifically tailored to a specific animal.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A method for controlling devices within an agricultural network system via a network bus, wherein the devices are controlled by means of control information which is transmitted to the devices by messages comprising a content and a header title, the method comprising:
   determining a function for performing thereof by a device in the network;
   determining the content of a message to be transmitted;
   compiling header title information for inclusion thereof in a header title for the message to be transmitted directly to devices to be controlled from a control initiating device or a control initiating server where control of the devices to be controlled is initiated; wherein:
   the header title information comprises a predetermined number of data fields each defining a subset of the devices to be controlled, other than device identifying fields with strict one-to-one correspondence comprising a device identifier, wherein complying with one or more of these data fields determines which of the devices to be controlled receive the message; and
   controlling, based on the content of the message and the header title information transmitted directly to devices, the devices to be controlled that receive the message, wherein the predetermined number of data fields includes:
   a first type of data field, a type field, relates to a type of device connected to the network bus, wherein the type field provides identification of a subset of devices having common traits or characteristics that is overlapable with a subset of devices identified with network fields, function fields, location fields, or group fields;
   a second type of data field, a function field, relates to a function to be performed by a device, wherein the function field provides identification of a subset of devices that is overlapable with a subset of devices identified with type fields, network fields, location fields, or group fields;

a third type of data field, a location field, relates to a location of a device, wherein the location field provides identification of a subset of devices that is overlapable with a subset of devices identified with type fields, network fields, function fields, or group fields;

a fourth type of data field, a group field, relates to a group of devices, wherein the group field provides identification of a subset of devices that is overlapable with a subset of devices identified with type fields, network fields, function fields, or location fields; and a fifth type of data field, a network field, relates to a network of devices, wherein the network field provides identification of a subset of devices that is overlapable with a subset of devices identified with type fields, function fields, location fields, or group fields.

2. The method as claimed in claim 1, wherein a data field is suitable for identifying 256 devices.

3. The method as claimed in claim 1, wherein the header title comprises a message type identifier.

4. The method as claimed in claim 1, wherein a value of any said data field is a broadcast value for designating each of two or more devices which comply with this data field.

5. A message reception module suitable for receiving messages formulated in accordance with the method as claimed in claim 1, which message reception module can be arranged in a device applied within an agricultural network system.

6. A device which can be applied within an agricultural network system for control by the method as claimed in claim 1, configured for receiving from a message reception module.

7. A network bus for linking controlling devices within an agricultural network system, comprising a processor for performing the steps of:

receiving control information with header title information based on a function for devices to perform;

determining a content of a message to be transmitted;

determining the devices to receive the message, wherein the header title information comprises a predetermined number of data fields each defining a subset of the devices to be controlled, other than device identifying fields with strict one-to-one correspondence comprising a device identifier, complying with one or more of these data fields; and transmitting directly to the devices to be controlled from a control initiating device or a control initiating server where control of the devices to be controlled is initiated, based on the header title information, the content of the message, wherein the device is controlled based on the content of the message, wherein the predetermined number of data fields includes:

a first type of data field, a type field, relates to a type of device connected to the network bus, wherein the type field provides identification of a subset of devices having common traits or characteristics that is overlapable with a subset of devices identified with network fields, function fields, location fields, or group fields;

a second type of data field, a function field, relates to a function to be performed by a device, wherein the function field provides identification of a subset of devices that is overlapable with a subset of devices identified with type fields, network fields, location fields, or group fields;

a third type of data field, a location field, relates to a location of a device, wherein the location field provides identification of a subset of devices that is overlapable with a subset of devices identified with type fields, network fields, function fields, or group fields;

a fourth type of data field, a group field, relates to a group of devices, wherein the group field provides identification of a subset of devices that is overlapable with a subset of devices identified with type fields, network fields, function fields, or location fields; and a fifth type of data field, a network field, relates to a network of devices, wherein the network field provides identification of a subset of devices that is overlapable with a subset of devices identified with type fields, function fields, location fields, or group fields.

8. A data message format generated by the method as claimed in claim 1 for controlling devices within an agricultural network system via a network bus, wherein the devices are controlled by control information transmitted to the devices by messages comprising a content and a header title.

9. A network protocol for applying in the method as claimed in claim 1 for controlling devices within an agricultural network system via a network bus, wherein the devices are controlled by control information transmitted to the devices by messages comprising a content and a header title.

10. The method as claimed in claim 1, wherein the network bus is a physical network bus or a logical network bus.

11. The method as claimed in claim 1, wherein at least one of the data fields defines at least one of the following: a subset of devices, a network identifier, a device type designation, a function designation, a location designation, a group designation, or any combination thereof.

12. The method as claimed in claim 1, wherein the function relates to at least one of the following: a milk pulsator, an automatic teat cup remover, a shut off valve, a gate control, or any combination thereof.

13. The method as claimed in claim 1, wherein the data field comprises two hexadecimal characters.

* * * * *